(12) United States Patent
Breitgand et al.

(10) Patent No.: US 10,929,190 B2
(45) Date of Patent: Feb. 23, 2021

(54) HETEROGENEOUS RESOURCE RESERVATION

(71) Applicant: International Business Machines Corporation, Armonk, NY (US)

(72) Inventors: David Breitgand, Modiin (IL); Michael Masin, Haifa (IL); Ofer Biran, Haifa (IL); Dean H. Lorenz, Haifa (IL); Eran Raichstein, Yokneam Illit (IL); Avi Weit, Haifa (IL); Ilyas Mohamed Iyoob, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/051,625

(22) Filed: Aug. 1, 2018

(65) Prior Publication Data

US 2020/0042352 A1 Feb. 6, 2020

(51) Int. Cl.
*G06F 9/50* (2006.01)
*H04L 12/911* (2013.01)
*H04L 12/24* (2006.01)

(52) U.S. Cl.
CPC ............ *G06F 9/505* (2013.01); *G06F 9/5077* (2013.01); *G06F 9/5083* (2013.01); *H04L 41/5029* (2013.01); *H04L 47/726* (2013.01); *H04L 47/822* (2013.01); *H04L 47/823* (2013.01); *G06F 2209/5014* (2013.01); *G06F 2209/5019* (2013.01)

(58) Field of Classification Search
None
See application file for complete search history.

(56) References Cited

U.S. PATENT DOCUMENTS

| 7,174,379 | B2* | 2/2007 | Agarwal | G06F 9/505 709/226 |
| 8,209,695 | B1 | 6/2012 | Pruyne et al. | |
| 8,601,474 | B2* | 12/2013 | Konik | G06F 9/455 718/1 |
| 8,806,015 | B2 | 8/2014 | Dutta et al. | |
| 9,515,905 | B1 | 12/2016 | Blanding et al. | |
| 9,729,465 | B2 | 8/2017 | Labocki | |
| 9,785,475 | B2 | 10/2017 | Cropper et al. | |

(Continued)

OTHER PUBLICATIONS

Biran et al. "Heterogeneous Resource Reservation", 2018 IEEE, pp. 141-147.*

(Continued)

*Primary Examiner* — Van H Nguyen
(74) *Attorney, Agent, or Firm* — Stosch Sabo (57) ABSTRACT

A heterogeneous resource reservation (HRR) manager configured to classify historical application requests from a past time interval for a first workload to generate labeled historical application requests. The HRR manager further configured to generate a forecast based on the labeled historical application requests and for predicting future application requests for the first workload for a future time interval and calculate a joint plan based on the forecast. The joint plan including a set of virtual resources, a set of billing contracts, and a set of load balancer weights. The HRR manager further configured to implement the joint plan for a distributed computing workload during the future time interval.

20 Claims, 7 Drawing Sheets

(56) References Cited

U.S. PATENT DOCUMENTS

| | | | | |
|---|---|---|---|---|
| 9,864,640 | B2* | 1/2018 | Kofkin-Hansen | G06F 9/5077 |
| 9,875,144 | B2* | 1/2018 | Kofkin-Hansen | G06F 9/5077 |
| 9,886,296 | B2* | 2/2018 | Clark | G06F 9/5077 |
| 10,176,004 | B2* | 1/2019 | Gardner | G06F 9/45558 |
| 10,203,993 | B2* | 2/2019 | Gopisetty | G06F 9/5088 |
| 2012/0123825 | A1* | 5/2012 | Biran | G06Q 10/0637 |
| | | | | 705/7.36 |
| 2015/0040137 | A1 | 2/2015 | Jackson | |
| 2015/0235156 | A1 | 8/2015 | Dasari et al. | |
| 2017/0031794 | A1 | 2/2017 | Cardonha et al. | |

OTHER PUBLICATIONS

Van den Bossche et al. "Optimizing IaaS Reserved Contract Procurement using Load Prediction", 2014 IEEE, pp. 88-95.*

Antonescu et al. "Dynamic SLA Management with Forecasting using Multi-Objective Optimization", 2013 IEEE, pp. 457-463.*

Kadioglu et al., "Heterogeneous Resource Allocation in Cloud Management", 2016 IEEE 15th International Symposium on Network Computing and Applications, Copyright 2016 IEEE, 4 pages, DOI: 10.1109/NCA.2016.7778589.

Sahni et al., "Heterogeneity-aware adaptive auto-scaling heuristic for improved QoS and resource usage in cloud environments", Apr. 2017, vol. 99, Issue 4, Abstract Only, 14 pages.

Wei et al., "Towards Efficient Resource Allocation for Heterogeneous Workloads in IaaS Clouds", IEEE Transactions on Cloud Computing, vol. 6, No. 1, Jan.-Mar. 2018, 12 pages.

Biran et al., "Heterogeneous Resource Reservation", 2018 IEEE International Conference on Cloud Engineering (IC2E), Apr. 2018, DOI: 10.1109/IC2E.2018.00037, 11 pages. Grace Period Disclosure.

Hong et al., "Selective Commitment and Selective Margin: Techniques to Minimize Cost in an IaaS Cloud", © 2012 IEEE, 2012 IEEE International Symposium on Performance Analysis of Systems and Software (ISPASS), Apr. 2012, 11 pages. http://dx.doi.org/10.1109/ISPASS.2012.6189210.

Khatua et al., "Heuristic-based Optimal Resource Provisioning in Application-centric Cloud", IEEE Transactions on Cloud Computing, Mar. 2014, 8 pages. http://arxiv.org/abs/1403.2508.

Van Den Bossche et al., "IaaS reserved contract procurement optimisation with load prediction," Future Generation Computer Systems, vol. 53, Dec. 2015, Abstract Only, 4 pages.

Wang et al., "Optimal Online Multi-Instance Acquisition in IaaS Clouds", IEEE Transactions on Parallel and Distributed Systems, vol. 26, No. 12, Dec. 2015, 13 pages.

Gong et al., "PRESS: PRedictive Elastic ReSource Scaling for cloud systems", 2010 International Conference on Network and Service Management (CNSM), Oct. 2010, DOI: 10.1109/CNSM.2010.5691343, 8 pages.

Hwang et al. "Portfolio Theory-Based Resource Assignment in a Cloud Computing System", 2012 IEEE Fifth International Conference on Cloud Computing, © 2012 IEEE, DOI 10.1109/CLOUD.2012.54, 8 pages.

Unknown, "AWS Trusted Advisor", AWS Support—Trusted Advisor, printed Jun. 1, 2018, 6 pages. https://aws.amazon.com/premiumsupport/trustedadvisor/.

Unknown, "Cloudability True Cost, Cloud Management Platform", printed Jun. 1, 2018, 9 pages. https://www.cloudability.com/platform/.

Unknown, "RightScale Optima", Cloud Cost Management, printed Jun. 1, 2018, 12 pages. https://www.rightscale.com/products-and-services/products/rightscale-optima?utm_expid=41192858-90.obUlWj2ZTA-1W_Bl5EXgQ.1&utm_referrer=https.

Unknown, "Cloud Cruiser 16", printed Jun. 1, 2018, 6 pages, Copyright © 2016 Cloud Cruiser. https://www.cloudcruiser.com/cloudcruiser16/.

Nutanix, "Nutanix Beam: Multi-Cloud Optimization by Nutanix to Reduce Cost & Enhance Cloud Security", printed Jan. 30, 2018, 11 pages, https://www.nutanix.com/products/beam/.

Mell et al., "The NIST Definition of Cloud Computing", Recommendations of the National Institute of Standards and Technology, Sep. 2011, 7 pages.

* cited by examiner

| Experiment | Acronym Meaning | Description |
|---|---|---|
| HRR | Heterogeneous Resource Reservation | HRR with monthly forecast of application requests combinations distribution and dynamic mapping of request types to VM types. Demand unmatched by the reservations is addressed by on-demand elasticity of the cloud. |
| HRR-DK | HRR with full requests Distribution Knowledge | HRR with knowledge of the actual application requests distribution per month instead of a forecast. |
| HRR-TK | HRR with full requests Time series Knowledge | HRR with full knowledge of exact time series of requests for the entire planning horizon. |
| SOTA | Current State of the Art | HRR with static mapping of request types to VM types minimizing cost (i.e., matching CPU/memory ratios). |
| SOTA-DK | SOTA with full requests Distribution Knowledge | SOTA with knowledge of the actual application requests distribution per month instead of a forecast. |
| PE | Pure Elasticity | Request types are statically mapped to VM types minimizing cost. All VM instances deployed on demand. |
| E-TK | Elasticity with full requests Time series Knowledge | Request types are dynamically mapped to VM types with full knowledge of exact time series of requests for the next hour. All VM instances are deployed on demand. |

| History | 1 WK | 2 WK | 1 MO | 4 MO | AVG % |
|---|---|---|---|---|---|
| HRR | 5697 | 5707 | 5745 | 5415 | - |
| PE | 12614 (121%) | 12614 (121%) | 12614 (120%) | 12614 (117%) | 120% |
| SOTA | 4795 (54%) | 4656 (52%) | 4654 (51%) | 9444 (62%) | 55% |
| E-TK | 9104 (60%) | 9104 (60%) | 9104 (59%) | 9104 (57%) | 59% |
| SOTA-DK | 4476 (49%) | 4476 (49%) | 4476 (44%) | 4476 (46%) | 48% |
| HRR-DK | 5641 (0%) | 5641 (0%) | 5641 (-1%) | 5641 (-2%) | -1% |
| HRR-TK | 5514 (-3%) | 5514 (-3%) | 5514 (-4%) | 5514 (-5%) | -4% |

| Region | US-East1 | US-West2 | US-West1 | AVG % |
|---|---|---|---|---|
| HRR | 6551 | 4442 | 4556 | - |
| PE | 4753 (34%) | 6324 (42%) | 6571 (44%) | 40% |
| SOTA | 7034 (7%) | 4955 (12%) | 4906 (4%) | 9% |
| E-TK | 4327 (27%) | 5795 (31%) | 6141 (36%) | 31% |
| SOTA-DK | 6353 (-3%) | 4544 (3%) | 3347 (-2%) | -1% |
| HRR-DK | 6114 (-7%) | 3904 (-12%) | 4260 (-6%) | -8% |
| HRR-TK | 5972 (-9%) | 3764 (-15%) | 4194 (-4%) | -11% |

HETEROGENEOUS RESOURCE RESERVATION

STATEMENT REGARDING PRIOR DISCLOSURES BY THE INVENTOR OR A JOINT INVENTOR

The following disclosure(s) are submitted under 35 U.S.C. 102(b)(1)(A): "Heterogeneous Resource Reservation", Ofer Biran, David Breithand, Dean Lorenz, Michael Masin, Eran Raichstein, Avi Weit, and Ilyas Iyoob, 19 Apr. 2018, 2018 IEEE International Conference on Cloud Engineering (IC2E).

BACKGROUND

The present disclosure relates to distributed computing, and, more specifically, to procuring appropriate virtual resources using appropriate reservation contracts for distributed computing workloads.

Distributed computing (e.g., cloud computing) virtually provides computational resources to customers, thereby allowing customers to use computational resources for data storage, data processing, and/or data management without needing to acquire and/or maintain hardware infrastructure associated with the computational resources. Distributed computing can use virtual machines (VMs) to provide customized computational resources for customers.

SUMMARY

Aspects of the present disclosure are directed toward a method comprising classifying historical application requests from a past time interval for a first workload to generate labeled historical application requests. The method can further comprise generating a forecast based on the labeled historical application requests and for predicting future application requests for the first workload for a future time interval. The method can further comprise calculating a joint plan based on the forecast. The joint plan can include a set of virtual resources, a set of billing contracts, and a set of load balancer weights. The set of virtual resources can include a first quantity of a first type of virtual machine procurable by a first billing contract of the set of billing contracts, and the set of load balancer weights can include a first fraction of a first application request type to be implemented by the first quantity of the first type of virtual machine during the future time interval. The method can further comprise implementing the joint plan during the future time interval.

Other aspects of the present disclosure are directed toward a system and a computer program product having similar characteristics as those described above. The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward distributed computing, and, more specifically, to procuring appropriate resources using appropriate reservation contracts for various distributed computing workloads. While the present disclosure is not necessarily limited to such applications, various aspects of the present disclosure can be appreciated through a discussion of various examples using this context.

Distributed computing (also referred to as cloud computing, virtual computing, on-demand computing, etc.) provides on-demand, elastic computational resources to remotely store, process, and/or manage data. As cloud computing becomes more prevalent, numerous cloud providers have entered the marketplace. Often, a single customer will use multiple cloud providers for remote storage, processing, and/or management of data. Furthermore, as cloud computing becomes more prevalent, numerous types of reservation contracts (also referred to as billing contracts) have been created (e.g., full ownership, dedicated servers, on-demand resources, reserved instances of different types of virtual machines (VMs), quantity discounts, sustained usage discounts, spot instances, etc.).

Thus, a first challenge in cloud computing is selecting an appropriate mixture of different types of reservation contracts to reserve appropriate numbers of appropriate types of virtual resources for appropriate periods of time, in order to reduce cost while ensuring sufficient computational resources to reliably perform future data storage, data processing, and/or data management tasks.

Aspects of the present disclosure overcome this first challenge by forecasting future combinations of request types using an empirical cumulative distribution function (ECDF) of historical data and providing the ECDF to a Mixed Integer Linear Program (MILP) capable of jointly calculating a beneficial (e.g., low cost, appropriate performance) selection of VMs (types, quantities) and reservation contracts (types, quantities, durations) sufficient to meet the forecasted requests. Thus, a first aspect of the present disclosure is directed toward efficient procurement of virtual resources.

A second challenge in cloud computing is executing heterogeneous tasks on homogenous resources (thereby wasting resources). For example, a first type of task can have a low computer processing unit (CPU)/memory ratio and a first type of virtual resource can have a balanced CPU/memory ratio. As a larger number of the first type of tasks are implemented on the first type of virtual resource, an increasing amount of the first type of virtual resource will be wasted CPU capacity (as a result of the mis-matched CPU/memory ratios).

Aspects of the present disclosure overcome this second challenge by applying respective weights to respective sub-auto scaling groups (ASGs) that are managed by a top-level ASG. The respective weights can dictate the proportion of tasks of a certain classification (e.g., CPU/memory ratio) that are processed at each sub-ASG. Each sub-ASG can be associated with a certain type of resource (e.g., memory-bound resources, CPU-bound resources, balanced resources, customized resources, etc.). As a result of the numerous homogenous sub-ASGs, the top-level ASG can function like a heterogeneous ASG, thereby improving the efficiency of processing heterogeneous tasks across a variety of homogenous resources (where each sub-ASGs may be homogenous, multiple sub-ASGs can be different from one another, and the top-level ASG can function as a heterogeneous ASG). Thus, a second aspect of the present disclosure is directed toward efficient use of virtual resources.

Aspects of the present disclosure combine the aforementioned first aspect (efficient procurement) with the aforementioned second aspect (efficient use) to realize synergistic improvements in total cost of implementing distributed workloads. In order to realize this advantage, aspects of the present disclosure first forecast combinations of request types in a future time interval based on data from a past time interval (e.g., using the ECDF). Second, aspects of the present disclosure determine appropriate quantities and types of VMs to satisfy the forecasted combinations of request types, thereby procuring an efficient quantity of VMs (e.g., using a MILP). Third, aspects of the present disclosure determine appropriate reservation contracts (e.g., type of contract, duration of contract, usage fee, setup fee, etc.) for procuring the appropriate quantities and types of VMs (thereby reducing costs associated with procuring the needed VMs). Fourth, aspects of the present disclosure efficiently process requests during the future time interval by applying individual weights to sub-ASGs of a top-level ASG to reduce wasted resources (e.g., requests are matched to sub-ASGs where the sub-ASG has a resource profile similar to the resource profile of the request).

Collectively, the aforementioned aspects of the present disclosure improve distributed computing performance by efficiently procuring virtual resources and efficiently executing workloads on the procured virtual resources. The aforementioned advantages are example advantages and not all advantages are listed. Furthermore, embodiments of the present disclosure exist that can contain all, some, or none of the aforementioned advantages while remaining within the spirit and scope of the present disclosure. The aforementioned advantages are discussed in more detail hereinafter with respect to the experimental results discussed in FIGS. 3A-3C.

Figure 1:
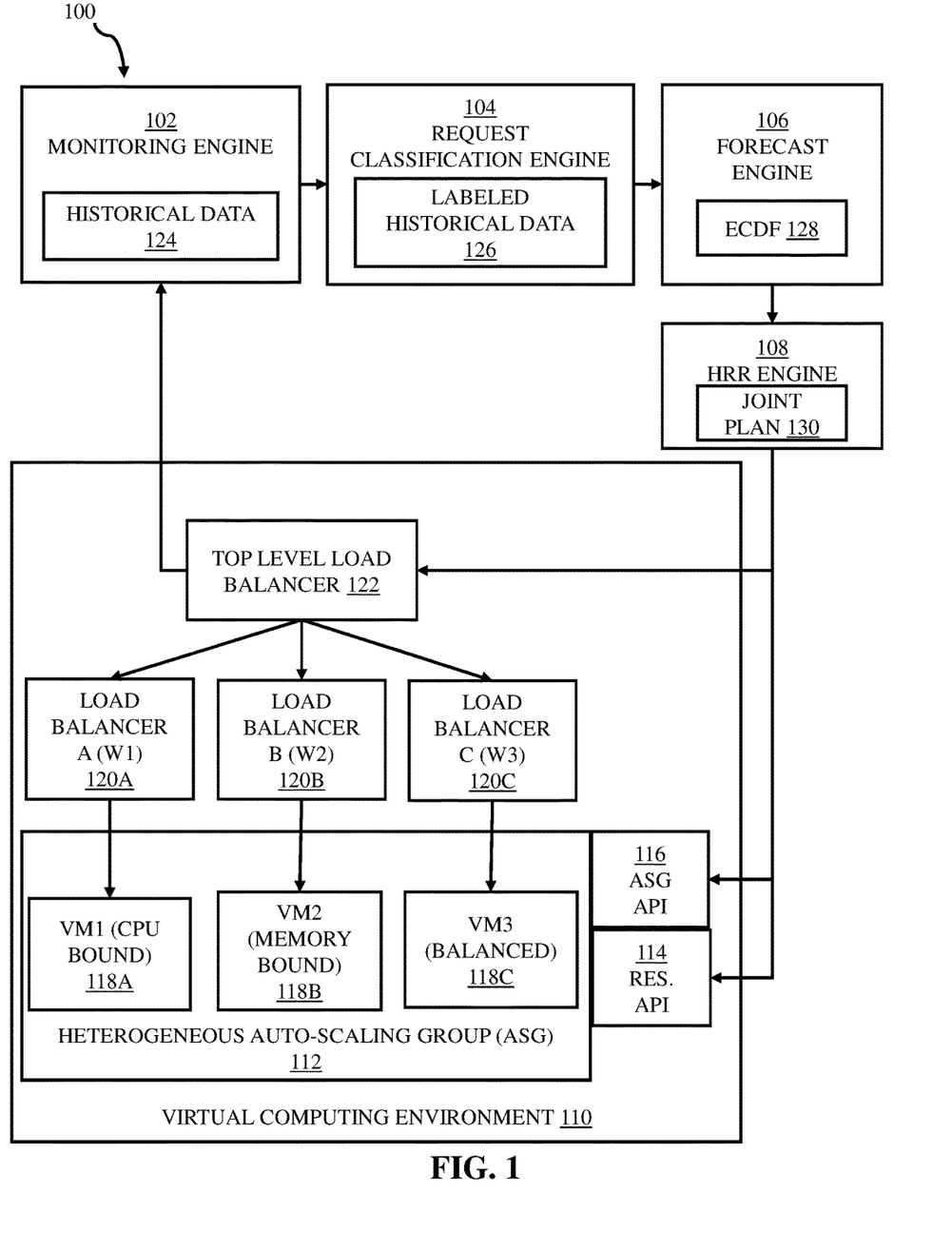
FIG. 1 illustrates a block diagram of an example distributed computing environment, in accordance with some embodiments of the present disclosure.

Referring now to FIG. 1, illustrated is a distributed computing environment 100, in accordance with some embodiments of the present disclosure. First, a brief overview of FIG. 1 may improve understanding of the subsequent detailed discussion with respect to FIG. 1.

Monitoring engine 102 can collect historical data 124 about resource usage (e.g., time utilization of VMs, detailed billing files, service requests inspection at Layer 7, etc.). In some embodiments, monitoring engine 102 can sample data from heterogeneous ASG 112 at regular intervals using top-level load balancer 122. The sampled data can be used to compare the statistical similarity of the historical data 124 to the newly sampled data using, for example, a Chi Square test (discussed in more detail later).

Request classification engine 104 can receive historical data 124 from the monitoring engine 102 and cluster similar requests to generate labeled historical data 126. In some embodiments, request classification engine 104 uses a ratio between CPU and memory (e.g., CPU/memory, memory/CPU, etc.) to classify the requests (e.g., application requests, VM requests, etc.). Thus, various ranges of the ratio between CPU and memory can be respectively labeled in order to cluster similar requests together.

Forecast engine 106 can use labeled historical data 126 from request classification engine 104 to generate ECDF 128. ECDF 128 can characterize the projected future distribution of request combinations. The ECDF 128 can account for periodicity and trends appearing in the historical data 126. In some embodiments, the ECDF 128 includes a confidence band associated with the ECDF 128 indicating low (conservative) and high (aggressive) predictions of request combination frequencies (e.g., a 95% likelihood that requests having a CPU/memory ratio between 0.98 and 1.02 comprise between 75% (lower bound) and 80% (upper bound) of all forecast requests for the future time interval). The ECDF 128 is discussed in more detail later.

Heterogeneous Resource Reservation (HRR) engine 108 can use a linear solver (e.g., IBM ILOG CPLEX®, which is a registered trademark of IBM Corporation) to generate a joint plan 130. Joint plan 130 can include an execution plan and an allocation plan. Joint plan 130 can define VM types, quantities of VMs per type, load balancer weights, and billing contract reservations. Joint plan 130 is discussed in more detail later.

The HRR engine 108 can implement the joint plan 130 by procuring the defined quantities of respective VM types (e.g., VMs 118A-118C) using the specified billing contract reservations and providing the joint plan 130 to top-level load balancer 122 for implementing the load balancing weights in the virtual computing environment 110. In some embodiments, the HRR engine 108 also communicates with a reservations API 118 for updating a reservation inventory. In some embodiments, the HRR engine 108 also communicates with an ASG API 116 for controlling the size of ASG 112 or its sub-ASGs (e.g., VM1 118A, VM2 118B, and VM3 118C).

Top-level load balancer 122 implements the joint plan 130 using a hierarchical load balancing structure where each sub-ASG (e.g., VM1 118A, VM2 118B, and VM3 118C) of heterogeneous ASG 112 is managed by its own respectively weighted load balancer (e.g., LB A 120A with weight W1, LB B 120B with weight W2, and LB C 120C with weight W3). The load balancing weights (discussed in more detail hereinafter) assist in efficiently matching request types to VM types (e.g., CPU-bound VM1 118A, memory-bound VM2 118B, balanced VM3 118C) to reduce wasted resources.

FIG. 1 is now discussed in greater detail to provide a more detailed understanding of various aspects of the present disclosure.

Forecast engine 106 can use labeled historical data 126 to generate ECDF 128 for forecasting future resource demands while the underlying probabilistic distribution remains statistically similar. For example, to determine if the current resource demand distribution is statistically similar to the historical resource demand distribution, a statistical test (e.g., a two sample Chi Square test) can be performed by the forecast engine 106 using labeled historical data 126 and a new sample of labeled data (not shown) from continuously generated data received from top-level load balancer 122 and processed by monitoring engine 102 and request classification engine 104. In the event that the forecast engine 106 cannot reject the null hypothesis ($H_0$) indicating that the two samples come from the same distribution, the forecast engine 106 can assume that the underlying distribution remains statistically unchanged and continue using a current ECDF 128. In the event that the null hypothesis is rejected, the labeled historical data 126 can be removed and a new set of more recent labeled historical data can be used to generate a new ECDF 128 for forecasting resource distribution by the forecast engine 106.

In some embodiments, the forecast engine 106 automatically recomputes the ECDF 128 when a predetermined amount of new data is accumulated (e.g., one month of hourly VM time utilization data).

In embodiments where the forecast engine 106 is used for the first time (e.g., cold-started), the forecast engine 106 can perform a non-parametric smoothed bootstrap procedure to estimate an underlying population distribution of requests from a preconfigured number of requests (e.g., a 1-week, 2-week, 1-month, 4-month, or a different time period to collect a sample of requests). Smoothed bootstrap samples can be generated by sampling observations with replacement and jittering each bootstrap observation by adding a small amount of random noise. As a result of this bootstrap procedure, the forecast engine 106 can obtain a sample size much larger than the original sample size that approximates a true distribution of application request combinations. The sample size generated by the non-parametric smoothed bootstrap procedure can be used to generate a first ECDF 128 until a sufficiently large amount of historical data is collected.

As discussed earlier, the ECDF 128 generated by forecast engine 106 can be associated with confidence intervals including an upper bound and a lower bound. Aspects of the present disclosure can use the lower bound (or any number between the average and the lower bound) of the confidence interval from the ECDF 128 in calculating the joint plan 130. Advantageously, using the lower bound can result in improved efficiency. Notably, in the event the joint plan 130 underestimates the number and/or type of computational resources needed (e.g., by using the lower bound), additional computational resources can be inexpensively purchased for a short period of time to supplement the deficiency. However, in the event the joint plan 130 overestimates the number and/or type of computational resources needed (e.g., by using the upper bound), the excess capacity can be associated with a long-term contract, and therefore, the resources associated with the excess capacity can be underutilized for at least a full billing cycle.

Referring now to HRR engine 108. In discussing the operation of HRR engine 108, the following notations in Table 1 are useful:

TABLE 1

Notations

| Notation | Definition |
| --- | --- |
| R | Set of request types, $r \in R$ |
| V | Set of virtual machine types, $v \in V$ |
| B | Set of billing contracts, $b \in B$ |
| Q | Set of resource types, $q \in Q$ |
| $H_t$ | Forecasted request types, $\bar{r}[h]$, $h \in [t, t + 1]$ |
| T | Sequence of time slots, $t \in T = 1, \ldots, T$ |
| r[h] | Parameter, workload demand of request type r at time $h \in [t, t + 1]$ |
| $w_q(r)$ | Parameter, required resource q for a unit of request type r |
| $w_q(r \to v)$ | Parameter, number of v type VMs required per r type request |
| $c_q(v)$ | Parameter, capacity of resources q in one virtual machine type v |
| $s^b(v)$ | Parameter, normalized setup fee per VM type v with contract b |
| $T^b$ | Parameter, reservation period for contract b |
| $u^b(v)$ | Parameter, hourly usage rate per one VM type v with contract b |
| $a_{r \to v}[t]$ | Variable, fraction of type r requests served by type v VMs at time interval $[t, t + 1]$ |
| $y_v^b[t]$ | Variable, number of type v VMs initialized under contract b at time t |
| $z_v^b[t]$ | Variable, number of type v VMs used under contract b at time t |
| $x_v^b[h]$ | Variable, number of type v VMs used under contract b at time $h. \in [t, t + 1]$ |

Each VM v in a set of heterogeneous VM types V can be characterized by its capacity along a set of consumable resource types Q. Thus, each $v \in V$ can be associated with a vector $\bar{c}(v) = \langle c_q(v) \rangle_{q \in Q}$ where $c_q(v)$ can be the capacity of a single instance of VM v for resource dimension q. The set Q can represent resources such as memory, CPU, disk, and so on.

An application can serve multiple request types, where each request type $r \in R$ can be characterized by its demand along the same resource dimension set Q. Thus, each request type can be associated with a vector $\bar{w}(r) = \langle w_q(r) \rangle_{q \in Q}$, where $w_q(r)$ can be the capacity requirements of a single instance of request type r. The term $w_q(r \to v)$ can be defined as the capacity requirements of VMs of type v that are needed to satisfy the requirement of a single request of type r for resource q. In some embodiments, $w_q(r \to v) = \alpha_{r \to v} w_q(r)$ in order to encode user priorities for using VMs of type v for requests of type r. For the sake of simplicity, and unless otherwise noted, $\alpha_{r \to v} = 1$.

In some embodiments, decisions on how many VMs of each type under each billing contract to activate are made at times h and VM configurations can remain in place throughout intervals [h, h+1]. The term h can correspond to the billing resolution of the cloud provider. Thus, improvements in intervals less than h are not anticipated to realize any financial benefit. Furthermore, at times $t = m \cdot h$ (multiples of h), decisions about purchasing new VMs can be made, thus, $T = M \cdot t$ can be used to denote the overall planning horizon. As one non-limiting example, h can correspond to hours, t can correspond to weeks, and T can correspond to months, however, alternative times are also applicable in different embodiments.

Sampling can occur at various times, and for every time instance h at which sampling occurs, there is $\bar{r}(h) = \langle r(h) \rangle_{r \in R}$ to denote the combination of request demands at time h, namely, the number of requests of each type that must be served at time h.

An application workload for each time interval $[t, t+1]$ where $t \in [1, T]$ is a time series of $\bar{r}(h)$. Advantageously, and as further discussed hereinafter, aspects of the present disclosure do not require an accurate prediction of time series. Rather than predicting the value of each $\bar{r}(h)$ for every request type at every point in time, aspects of the present disclosure only need to predict the counts of each value of $\bar{r}(h)$ over the entire window $H_t$. In other words, aspects of the present disclosure benefit from predicting the overall number of hours each $\bar{r}$ is served rather than the exact times it is served. Thus, aspects of the present disclosure calculate the empiric probability distribution function of the workload as a whole, which is easier (e.g., less time, less computational cost) to predict than a specific time series.

There can be a set of billing contracts B, where each contract $b \in B$ defines an effective hourly rate for each VM type. The effective hourly rate for each contract b, per a particular machine type v, can comprise a usage rate $u^b(v)$ and a flat setup fee $s^b(v)$. The usage rate can be paid per each h per each VM used. In other words, if $x_v^b[h]$ VMs of type v are used at time h, then the usage cost for time h is $u^b(v) \cdot x_v^b[h]$. The setup fee can be paid per payment cycle $T^b$ by the number of initialized VMs. In other words, if $y_v^b[t]$ VMs of type v are initialized at time t, then the flat setup cost for the entire pay cycle $[(t+1), (t+2), \ldots, (t+T^b)]$ is $s^b(v) \cdot y_v^b[t]$. In embodiments where the flat setup fee is not zero, then a VM can be used only if its setup fee is paid. Defined mathematically, this concept can be expressed as $x_v^b[h] \leq \Sigma_{t=T^b}^{t-1} y_v^b[t] \forall t, h \in H_t$. Furthermore, embodiments of the present disclosure can define $c_q^b(v)$ as the effective capacity of VMs of type v under billing contract b for resource q. Usually, $c_q^b(v) = c_q(v)$, unless otherwise defined to account for special types of billing contracts.

Various existing cloud contract models can be described by a combination of usage rates, setup fees, and payment cycles. For example, a pure pay-as-you-go model has a usage rate and not setup fee. In contrast, a pure reservation-based model has a setup fee, a substantial payment cycle, and no usage rate. As another example, a simple reservation model includes VMs that can only be reserved once per payment cycle.

Aspects of the present disclosure improve efficiency for resource provisioning in distributed computing environments. For a given workload, aspects of the present disclosure can generate a joint plan 130 that includes an execution plan and an allocation plan. The execution plan can define the number of VMs of each type that are used in any interval $[t_i, t_{i+1}]$ and the types of billing contracts that should be used to procure those VMs. The allocation plan can specify how many instances of each VM type are allocated to serve which request types.

In other words, the execution plan can ensure sufficient resources are procured to satisfy the forecasted resource demand (based on ECDF 128) and that those resources are efficiently procured (e.g., by strategically procuring the resources using a variety of billing contracts to decrease cost). Meanwhile, the allocation plan can efficiently process data by matching requests to VMs that have similar resource requirements and capabilities using load balancers with respective weights (e.g., load balancers A-C 120A-120C). As previously discussed, aspects of the present disclosure realized improvements in distributed computing performance as a result of the separate benefits provided by the execution plan and the allocation plan.

The execution plan for each VM type can be denoted by two time series. The first series, $(y_v^b[1], y_v^b[2], \ldots y_v^b[T])$ can define how many VMs of type v are initialized under billing contract b at each point in time t. The second series, $(y_v^b[1], y_v^b[2], \ldots y_v^b[T])$ can define how many VMs of type v are expected to be used under billing contract b during period t.

The allocation plan can be denoted by the time series $(\alpha_{r \to v}[1], \alpha_{r \to v}[2], \ldots \alpha_{r \to v}[T])$, where $\alpha_{r \to v}[t]$ can be realized by setting $\alpha_{r \to v}[t]$ as weights in respective load balancers (e.g., load balancers 120A, 120B, 120C). Respective load balancers can set different weights for different request types. To achieve this, respective load balancers can classify requests as they are being served (e.g., by inspecting a uniform resource locator (URL)). In some embodiments, the weights are dynamically adjusted per time slot t. In other embodiments, the weights remain static.

In light of the discussion provided above, aspects of the present disclosure can define a workload according to Equation 1:

$$W[t,t+1] = (\bar{r}[1], \bar{r}[2], \ldots \bar{r}[m*h]), t \in [1,T] \quad \text{Equation 1:}$$

For a workload defined according to Equation 1, aspects of the present disclosure can minimize the total cost according to Equation 2:

$$\text{TotalCost} = \Sigma_{t \in T, v \in V, b \in B}(s^b(v) y_v^b[t] + u^b(v) z_v^b[t]) \quad \text{Equation 2:}$$

In minimizing the total cost using Equation 2, aspects of the present disclosure can apply the following constraints defined in Equations 3-7:

$$\Sigma_{v \in V} a_{r \to v}[t] = 1 \quad \text{Equation 3:}$$

$$\Sigma_{b \in B} c_q^b(v) x_v^b[h] \geq \Sigma_{r \in R} a_{r \to v}[t] r[h] w_q(r \to v) \quad \text{Equation 4:}$$

$$x_v^b[h] \leq \Sigma_{\tau = t - T^b + 1}^{t} y_v^b[\tau] \quad \text{Equation 5:}$$

$$z_v^b[t] = \rho_t \Sigma_{h \in H_t} x_v^b[h] \quad \text{Equation 6:}$$

$$a_{r \to v}[t], z_v^b[t] \geq 0; y_v^b, x_v^b \in Z \quad \text{Equation 7:}$$

It is to be understood that for the purposes of the present disclosure, minimizing the total cost relates to improving, reducing, or otherwise modifying the total cost in order to realize benefits in performance, efficiency, and/or cost. Thus, "minimizing" should not be construed to mean a single, optimal solution, but rather a framework for achieving improvements within the confines of processing power constraints, cost constraints, and/or time constraints.

Thus, the total cost calculated in Equation 2 using the constraints defined in Equations 3-7 includes setup and usage costs of all VMs under all contracts. Equation 3 can be used to ensure that the allocation plan is valid (e.g., that all requests are served). Equation 4 can be used to ensure that the total capacity of the VMs is enough to support the total demand of the workload. Equation 5 can be optional and applies to billing contracts that offer reduced effective hourly rates for VMs that are reserved and paid for in advance (e.g., such contracts can have a non-zero setup cost and may have zero usage rate). Equation 6 can be used with synchronization coefficient $\rho_t$ $$\left(\text{e.g., } \rho_t = \frac{m}{|H_t|}\right)$$

and Equation 7 can define the allowed domain of the decision variables.

Advantageously, aspects of the present disclosure can generalize the total cost calculation of Equation 2 to generalized contracts (e.g., contracts that could be represented by multiple basic contracts), thereby accounting for utilization-based contracts, standard VM contracts, specialized VM contracts, and other contract types known by one skilled in the art. Equation 2 can be generalized according to Equation 8. Equation 8 replaces b∈B with g∈G, b∈$B_g$ for a set of generalized contracts G where, for each g∈G there is a corresponding set of basic contracts $B_g$ and a set of reservation constraints $E_g$:

$$\text{TotalCost} = \Sigma_{t \in T, v \in V, g \in G, b \in B_g}(s^b(v)y_v^b[t] + u^b(v)z_v^b[t])$$  Equation 8:

For the generalized Equation 8, previously discussed Equation 5 is generalized according to Equation 9:

$$\Sigma_{(b,v) \in D_t^e} k_v^b x_v^b[h] \leq \Sigma_{(b,v,\tau) \in F_t^e} l_v^b y_v^b[\tau]$$  Equation 9:

As shown in Equation 9, $D_t^e$ and $F_t^e$ can be sets for cloud usage and reservation summations, respectively, for each constraint type e and reservation time t, and $k_v^b$ and $l_v^b$ can be respective user-defined coefficients.

HRR engine 108 can solve Equation 2 and/or Equation 8 according to the aforementioned constraints. HRR engine 108 can use a MILP to solve the aforementioned equations. In some embodiments, the HRR engine 108 uses a branch-and-bound algorithm, a genetic algorithm, an evolutionary algorithm, or a different algorithm capable of calculating an optimal (or sufficiently adequate) solution. In some embodiments, the HRR engine 108 uses IBM ILOG CPLEX® to solve Equation 2 and/or Equation 8 according to the aforementioned constraints. In some embodiments, joint plan 130 can comprise a file outputted as a result of solving Equation 2 and/or Equation 8 according to the aforementioned constraints and defined VM quantities, VM types, billing contracts, and load balancer weights. HRR engine 108 can implement the joint plan 130 as previously discussed (e.g., by procuring the VM quantities and VM types using the billing contracts and executing a workload on the procured virtual resources using the load balancer weights).

Figure 2:
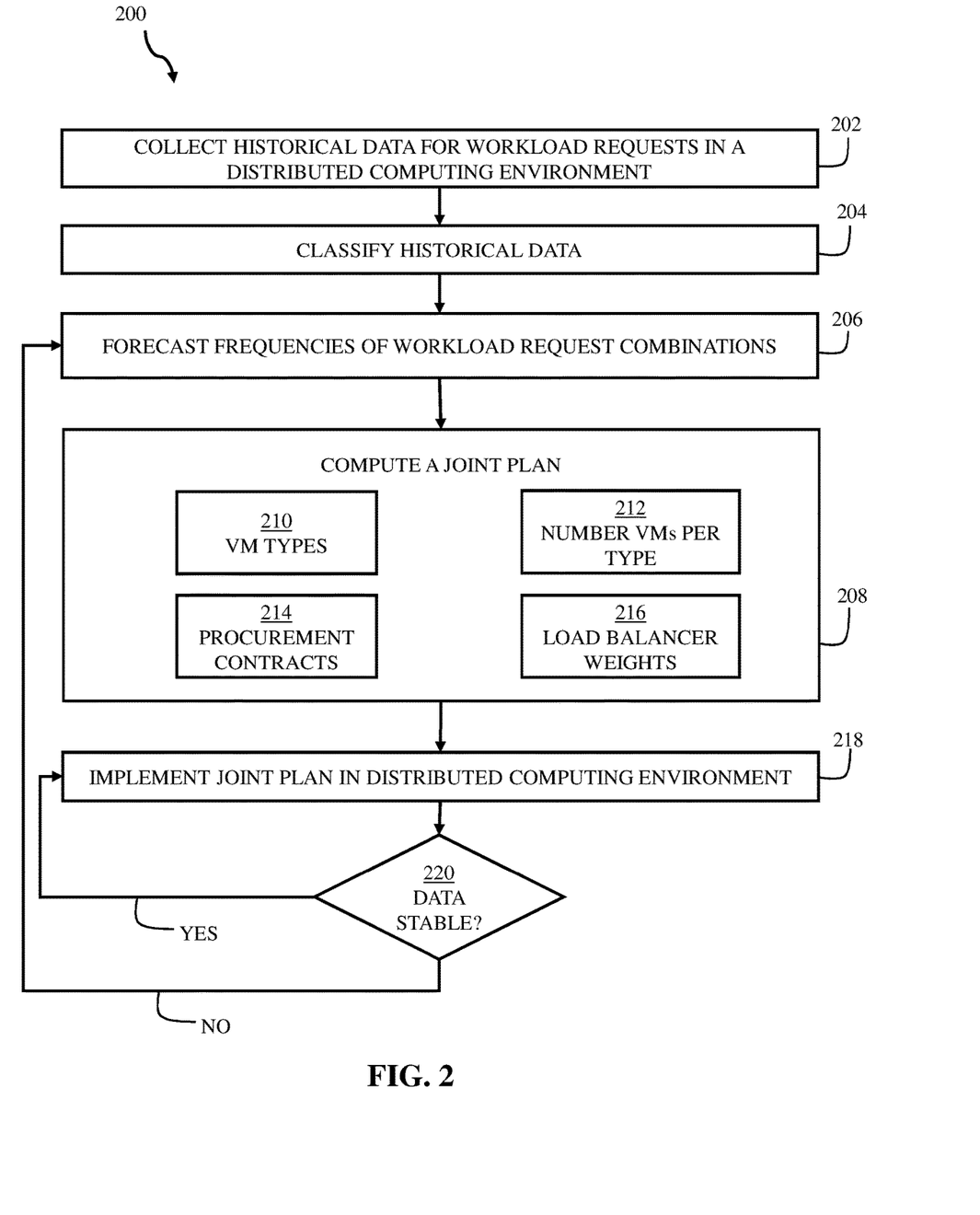
FIG. 2 illustrates a flowchart of an example method for generating and implementing a joint plan, in accordance with some embodiments of the present disclosure.

Referring now to FIG. 2, illustrated is a flowchart of an example method for generating and implementing a joint plan in a distributed computing environment, in accordance with some embodiments of the present disclosure. In various embodiments, the operations of the method 200 can be implemented by a processor executing computer-readable instructions, by various components in a distributed computing environment such as distributed computing environment 100 of FIG. 1, or by other configurations of hardware and software, including middleware in a cloud brokerage application.

Operation 202 can include collecting historical data for workload requests from a first time interval in a distributed computing environment. In some embodiments, operation 202 can be performed by monitoring engine 102 of FIG. 1. In some embodiments, the collected historical data can be consistent with historical data 124 of FIG. 1. The historical data can comprise information regarding individual requests (e.g., types and amounts of resources required for respective requests, etc.).

Operation 204 can include classifying the historical data collected in operation 204. In some embodiments, operation 204 can be performed by request classification engine 104 of FIG. 1. In some embodiments, the classified historical data can be consistent with labeled historical data 126 of FIG. 1. In some embodiments, the classified historical data can be classified according to any number of metrics such as, but not limited to, CPU requirements, memory requirements, a ratio of CPU to memory requirements (e.g., a CPU/memory ratio), or a different method of classification. In some embodiments, operation 204 includes labeling the historical data according to the classification.

Operation 206 can include forecasting frequencies of various workload request combinations for a future time interval based on the historical data classified in operation 204. In some embodiments, operation 206 is performed by forecast engine 106 of FIG. 1 and uses an ECDF such as ECDF 128 of FIG. 1. In embodiments where the forecast utilizes an ECDF, the ECDF can include confidence intervals indicating an upper bound and a lower bound such that the expected value will fall within the two bounds with a specified confidence level.

Although ECDFs are discussed above, other statistical techniques for predicting future resource requirements fall within the spirit and scope of the present disclosure.

Operation 208 can include computing a joint plan based on the forecast frequencies of request combinations generated in operation 206. In some embodiments, operation 208 is performed by HRR engine 108 of FIG. 1 and outputs the joint plan 130 of FIG. 1. The joint plan can comprise one or more VM types 210 (e.g., memory-bound, CPU-bound, balanced, custom, etc.), a number of VMs per type 212, procurement contracts 214 for acquiring the number of VMs 212 and VM types 210 (e.g., procurement contracts 214 can define durations, setup fees, usage fees, utilization discounts, etc.), and load balancer weights 216 (e.g., weights configured to efficiently match requests to VMs). The joint plan can also be described as an execution plan and an allocation plan, where the execution plan defines the VM types 210, the number of VMs per type 212, and the procurement contracts 214, while the allocation plan defines the load balancer weights 216.

In some embodiments, operation 208 can be performed by a MILP, IBM ILOG CPLEX®, or a different combination of hardware and/or software capable of determining an adequate solution.

Operation 218 can include implementing the joint plan in the distributed computing environment. Implementing the joint plan can include procuring the VM types 210 and the number of VMs per type 212 using the defined procurement contracts 214. Implementing the joint plan can further include setting the load balancer weights 216 to respective sub-ASGs in the heterogeneous ASG (e.g., load balancers A-C 120A-120C of FIG. 1). Implementing the joint can further include executing tasks on the procured VMs according to the load balancer weights 216.

For example, the joint plan can be described as a set of virtual resources, a set of billing contracts, and a set of load balancer weights, wherein the set of virtual resources includes a first quantity of a first type of VM that is procured by a first billing contract of the set of billing contracts. The set of load balancer weights can include a first fraction of a first application request type to be implemented by the first quantity of the first type of virtual machine.

Continuing the example, implementing the joint plan can include procuring the first quantity of the first type of virtual machine using the first billing contract, and subsequently serving a received application request of the first application request type on the first quantity of the first type of virtual machine according to the first fraction.

Operation 220 can determine if newly acquired and classified data generated as a result of implementing the joint plan in the distributed computing environment is statistically stable when compared to the classified historical data from operation 204. Operation 220 can include performing a two-sample statistical test (e.g., a two-sample Chi-Square test as previously described) between the classified historical data from operation 204 and the newly acquired and classified data. In the event that the data is stable (e.g., the null hypothesis is not rejected), the method 200 returns to operation 218 and continues implementing the joint plan unmodified in the distributed computing environment. In the event that the data is no longer statistically similar (e.g., the null hypothesis is rejected), then the method 200 can return to operation 206 and generate a new forecast (e.g., a new ECDF) based on the newly acquired and classified data. The method 200 can then proceed through operations 208 and 218 again in order to compute an updated joint plan and implement the updated joint plan to the distributed computing environment.

Although a Chi-Square test is discussed above with respect to operation 220, any number of statistical tests, techniques, and/or methods useful for determining the stability of multiple sets of data fall within the spirit and scope of the present disclosure.

Figure 3A:
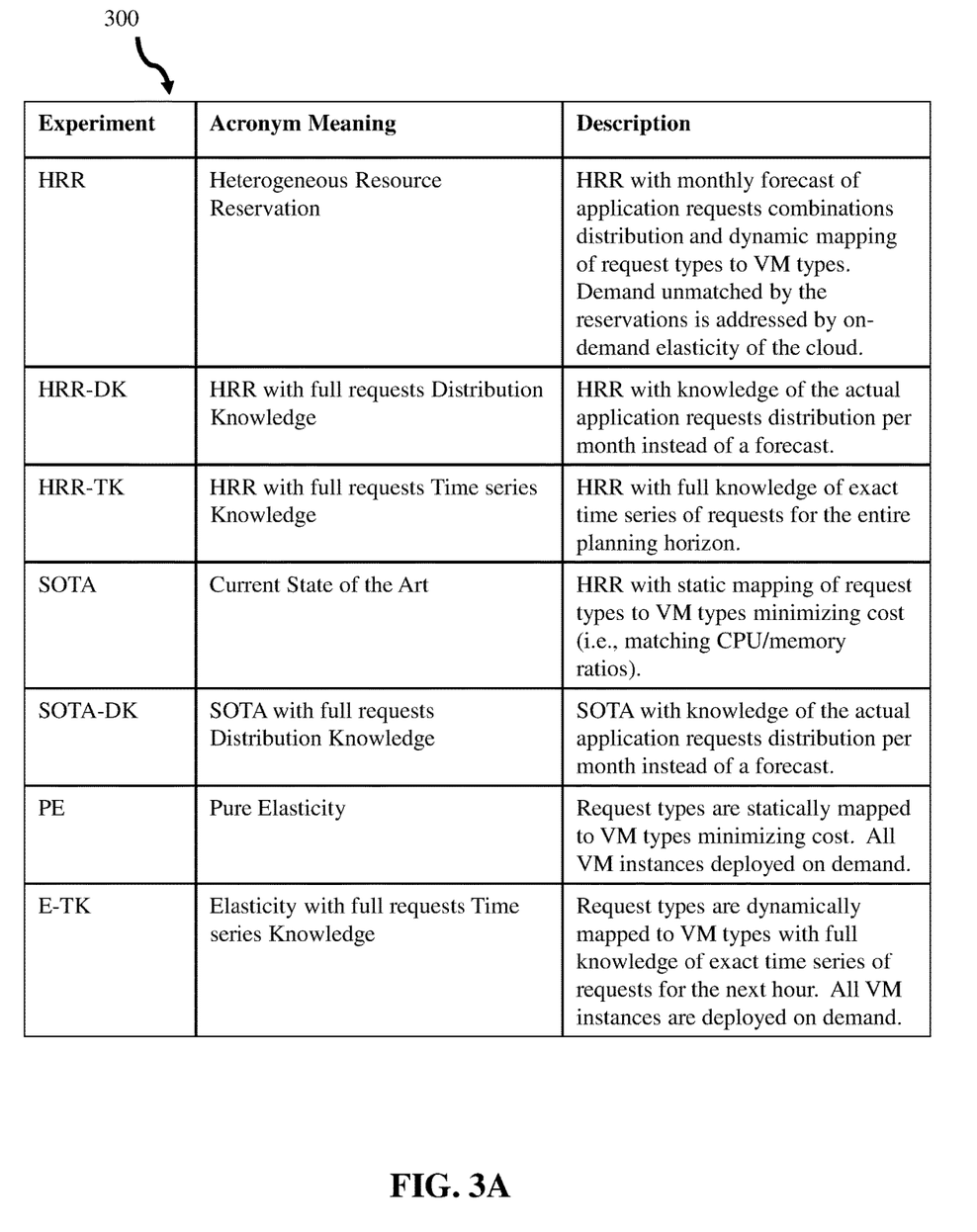
FIG. 3A lists experimental models, in accordance with some embodiments of the present disclosure.

Referring now to FIG. 3A, illustrated is a table 300 summarizing various models used to conduct experiments on clusterdata-2011-2 trace data representing 29 days of information collected from a Google® (registered trademark of Google LLC) cluster of about 12,500 machines in May 2011 (results summarized in FIG. 3B) and a set of data from a workload operating on Amazon Web Services® (AWS®) (registered trademarks of Amazon Technologies, Inc.) (results summarized in FIG. 3C). All experiments were performed on a standard laptop Lenovo® (registered trademark of Lenovo Limited Corporation) TP W530 i7-3740QM 2.7 GH having 16 GB Ram and 8 cores and using IBM ILOG CPLEX® 12.6.3. In all experiments, a one-month ECDF forecast was used.

As shown in the table 300, a first model comprises Heterogeneous Resource Reservation (HRR) using a monthly forecast of application request combinations (e.g., using ECDF 128 of FIG. 1) and dynamic mapping of request types to VM types (e.g., using load balancer weights 120A-120C). The HRR model is consistent with embodiments of the present disclosure. In the HRR model, the demand not matched by the reservations can be addressed by on-demand elasticity provided by a cloud provider.

A second model comprises HRR with full requests distribution knowledge (HRR-DK). HRR-DK is a model with knowledge of the actual application request distribution per month instead of a forecast.

A third model comprises HRR with full requests time series knowledge (HRR-TK). HRR-TK is a HRR model with full knowledge of exact time series of requests for the entire planning horizon.

A fourth model comprises a state-of-the-art (SOTA) model which comprises the HRR model with static mapping for request types to VM types to minimize cost (e.g., by matching CPU/memory ratios).

A fifth model comprises a SOTA-DK model which is the SOTA model with knowledge of actual application requests distribution per month instead of a forecast.

A sixth model comprises a pure elasticity (PE) model where request types are statically mapped to VM types to minimize cost, and where all VM instances are deployed on demand.

A seventh model comprises an elasticity with full request time series knowledge (E-TK) where request types are dynamically mapped to VM types with full knowledge of exact time series of requests for the next hour.

For the purposes of experimentation, the HRR-DK, HRR-TK, and E-TK models are theoretical algorithms insofar as they are provided future data (rather than predicting it, as is done by the HRR model using ECDF). Thus, HRR-DK can be used to measure the importance of precisely forecasting application request distribution. Likewise, HRR-TK can be used to measure the importance of knowing the exact time series of requests. E-TK illustrates the opportunity for dynamic resource diversification.

Figure 3B:
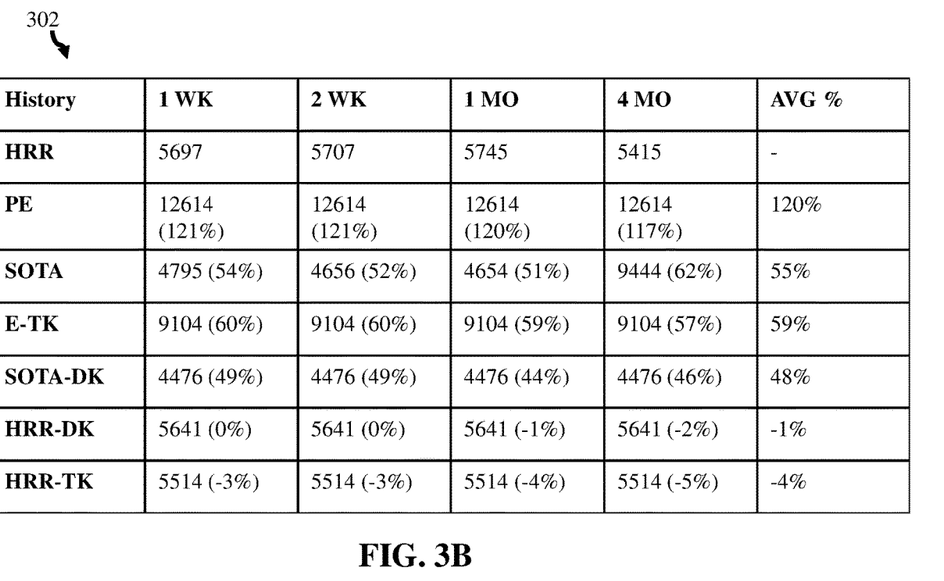
FIG. 3B lists a first set of experimental results, in accordance with some embodiments of the present disclosure.

Referring now to FIG. 3B, illustrated is a first experimental results table 302 demonstrating absolute total cost of resource consumption for each experimental model and relative performance compared to the HRR model. In the first experimental results table 302, the top row contains the minimal history window before predicting a one-month forecast using ECDF (e.g., 1 week to 4 months).

First, the first experimental results table 302 demonstrates that the HRR model outperforms other models. As shown in first experimental results table 302, HRR model outperforms PE, SOTA, E-TK, and SOTA-DK by an average of 120%, 55%, 59%, and 48% respectively.

Second, the first experimental results table 302 demonstrates that the HRR model utilizes a robust algorithm. For example, the HRR model underperforms the idealized HRR-DK and HRR-TK models in the range 1%-3% and 3%-5% respectively. Thus, the HRR model performs nearly as well as the theoretically optimal models.

Third, the first experimental results table 302 demonstrates that the HRR model requires limited training. For example, the columns of various minimum window training sizes for the HRR model indicate that the different window sizes have limited impact on the HRR model performance.

Figure 3C:
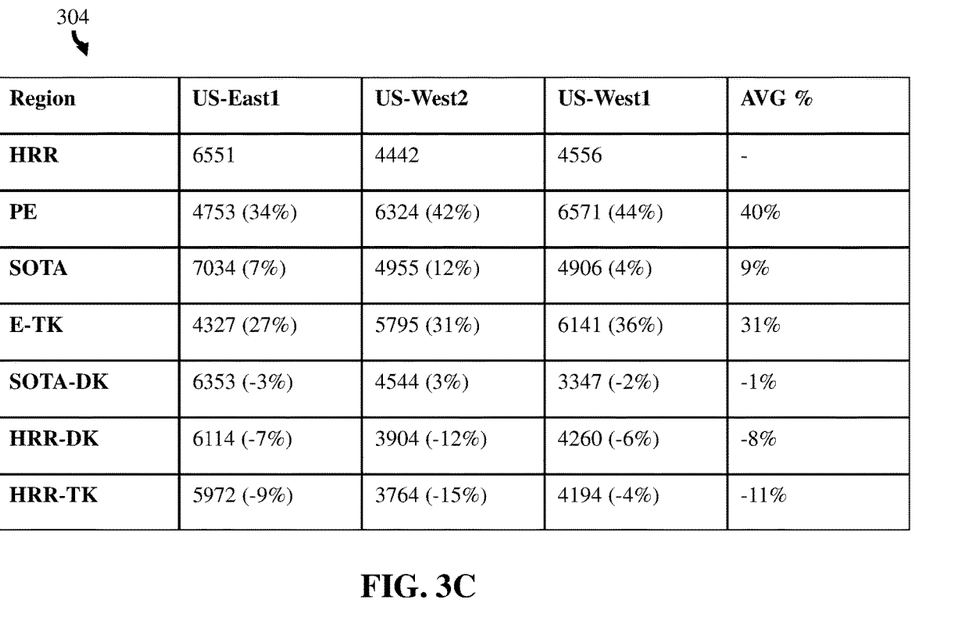
FIG. 3C lists a second set of experimental results, in accordance with some embodiments of the present disclosure.

Referring now to FIG. 3C, illustrated is a second experimental results table 304 demonstrating absolute total cost of resource consumption for each experimental model and relative performance compared to the HRR model. In the second experimental results table 304, each column represents a region rather than a minimal history window (as in FIG. 3B). The minimal history window for each experiment in FIG. 3C is one month.

As shown in second experimental results table 304, the HRR model outperforms PE, SOTA, and E-TK by an average of 40%, 9%, and 31%, respectively. While the improvements illustrated in FIG. 3C are less than those illustrated in FIG. 3B (because the AWS already includes best mapping of requests to VMs), the improvements are nonetheless substantial.

Figure 4:
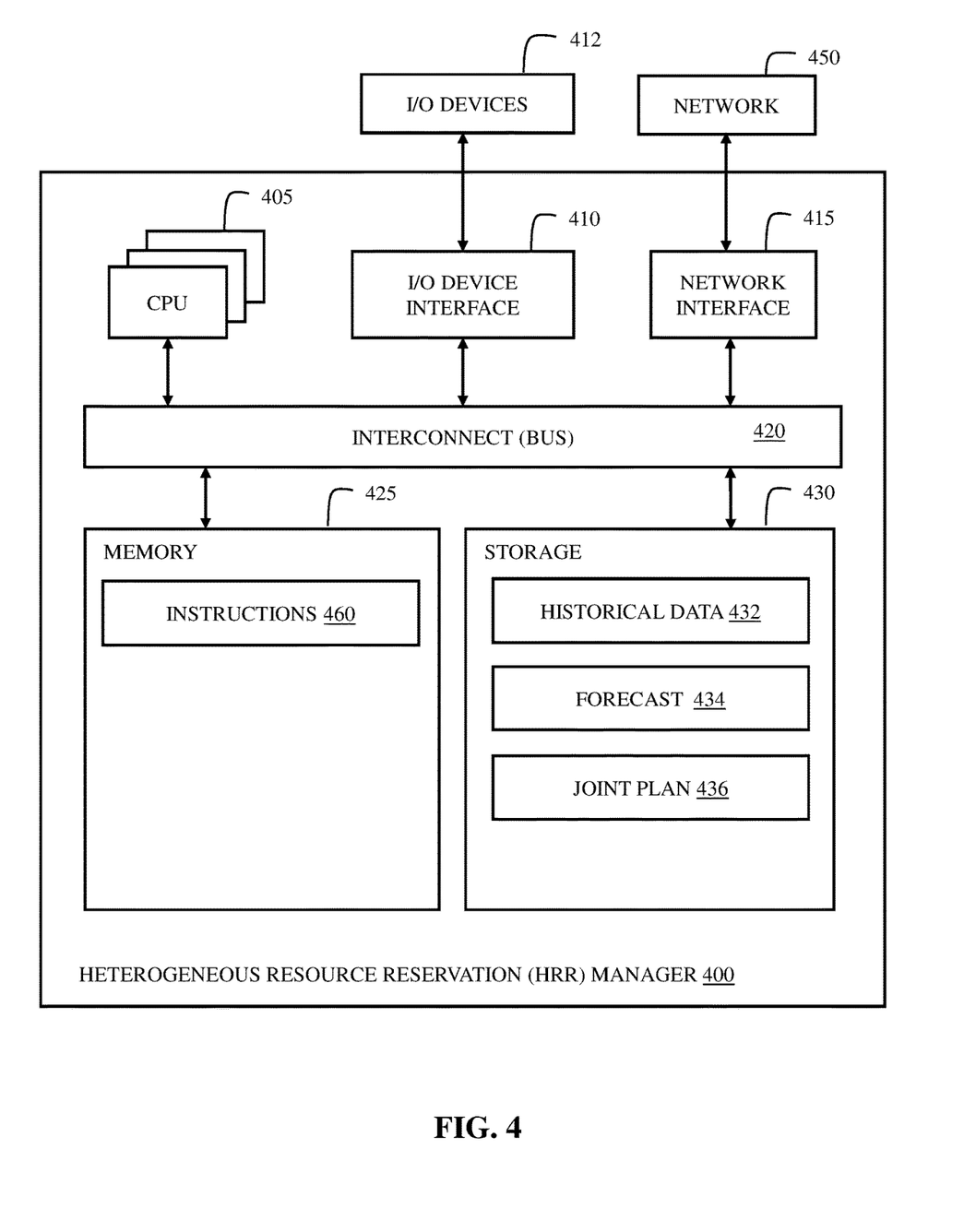
FIG. 4 illustrates a block diagram of a heterogeneous resource reservation (HRR) manager, in accordance with some embodiments of the present disclosure.

FIG. 4 illustrates a block diagram of an example heterogeneous resource reservation (HRR) manager 400 in accordance with some embodiments of the present disclosure. In various embodiments, HRR manager 400 can perform the method 200 described in FIG. 2. In some embodiments, HRR manager 400 provides instructions for the method 200 described in FIG. 2 to a client machine such that the client machine executes the method, or a portion of the method, based on the instructions provided by the HRR manager 400. HRR manager 400 can be consistent with any one, or any combination of, monitoring engine 102, request classification engine 104, forecast engine 106, and/or HRR engine 108.

The HRR manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, or flash memory devices. In an alternative embodiment, the storage 430 can be replaced by storage area-network (SAN) devices, the cloud, or other devices connected to the HRR manager 400 via the I/O device interface 410 or a network 450 via the network interface 415.

In some embodiments, the memory 425 stores instructions 460 and the storage 430 stores historical data 432, forecast 434, and joint plan 436. However, in various embodiments, the instructions 460, historical data 432, forecast 434, and joint plan 436 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all of, the method 200 of FIG. 2. Historical data 432 can be consistent with historical data 124 and/or labeled historical data 126 of FIG. 1. Forecast 434 can be consistent with ECDF 128 of FIG. 1. Joint plan 436 can be consistent with joint plan 130 of FIG. 1.

In various embodiments, the I/O devices 412 include an interface capable of presenting information and receiving input. For example, I/O devices 412 can present information to a user interacting with HRR manager 400 and receive input from the user.

HRR manager 400 is connected to the network 450 via the network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
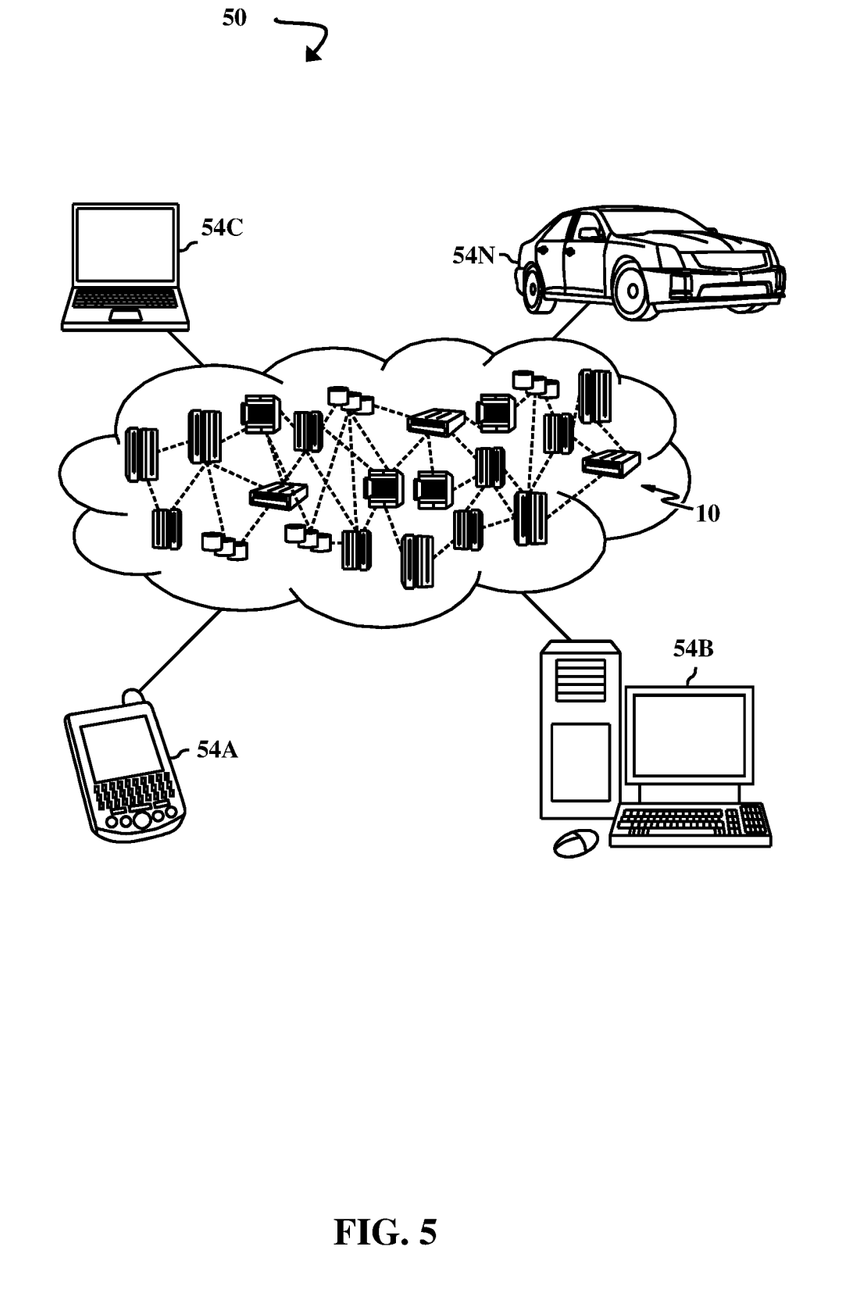
FIG. 5 depicts a cloud computing environment, according to some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
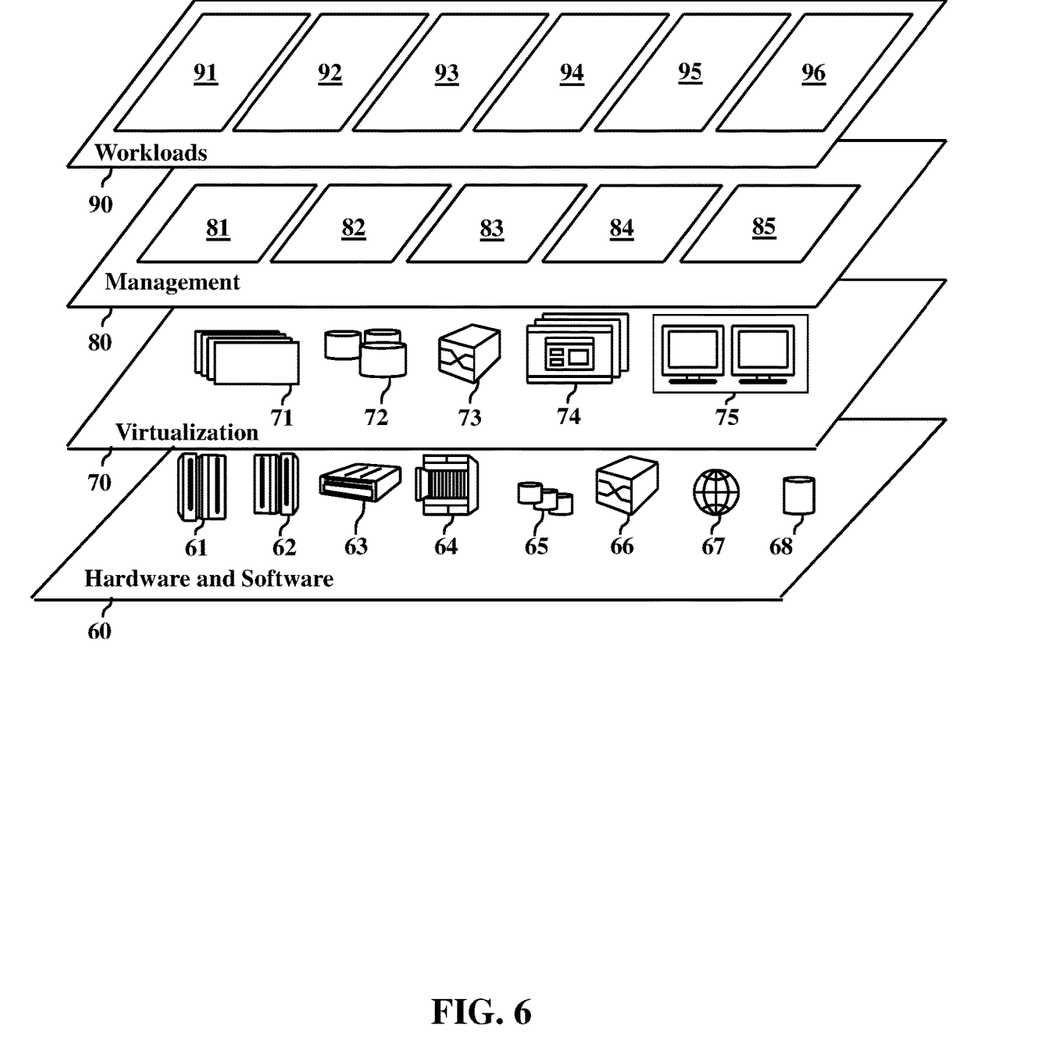
FIG. 6 depicts abstraction model layers, according to some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed deep learning 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIG. 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
classifying historical application requests from a past time interval for a first workload to generate labeled historical application requests;
generating a forecast based on the labeled historical application requests and for predicting future application requests for the first workload for a future time interval;
calculating a joint plan based on the forecast, wherein the joint plan comprises a set of virtual resources, a set of billing contracts, and a set of load balancer weights, wherein the set of virtual resources comprises a first quantity of a first type of virtual machine that is procured by a first billing contract of the set of billing contracts, and wherein the set of load balancer weights comprises a first fraction of a first application request type to be implemented by the first quantity of the first type of virtual machine during the future time interval; and
implementing the joint plan during the future time interval.

2. The method of claim 1, wherein classifying the historical application requests comprises classifying the historical application requests based on a ratio of computer processing unit (CPU) and memory for the historical application requests.

3. The method of claim 1, wherein the forecast comprises confidence intervals including an upper bound and a lower bound.

4. The method of claim 3, wherein calculating the joint plan is based on the lower bound of the forecast.

5. The method of claim 1, further comprising:
performing a two-sample test using the labeled historical application requests and updated labeled application requests received after the labeled historical application requests.

6. The method of claim 5, further comprising:
in response to rejecting a null hypothesis that the labeled historical application requests and the updated labeled application requests are from the same distribution, generating a new forecast using the updated labeled application requests.

7. The method of claim 1, wherein the past time interval is at most one week, and wherein the future time interval is at least one month.

8. The method of claim 1, wherein the first billing contract comprises a first usage fee, a first setup fee, and a first duration.

9. The method of claim 1, wherein the forecast predicts, for a first application request type, a total number of hours for serving the first application request type in the future time interval.

10. The method of claim 1, wherein implementing the joint plan comprises procuring the first quantity of the first type of virtual machine using the first billing contract, and serving a received application request from the future time interval and of the first application request type on the first quantity of the first type of virtual machine according to the first fraction.

11. The method of claim 1, wherein the joint plan is calculated using a mixed-integer linear program (MILP).

12. A system comprising:
a processor; and
a computer readable storage medium storing program instructions executed by the processor to cause the processor to perform a method comprising:
classifying historical application requests from a past time interval for a first workload to generate labeled historical application requests;
generating a forecast based on the labeled historical application requests and for predicting future application requests for the first workload for a future time interval;
calculating a joint plan based on the forecast, wherein the joint plan comprises a set of virtual resources, a set of billing contracts, and a set of load balancer weights, wherein the set of virtual resources comprises a first quantity of a first type of virtual machine that is procured by a first billing contract of the set of billing contracts, and wherein the set of load balancer weights comprises a first fraction of a first application request type to be implemented by the first quantity of the first type of virtual machine during the future time interval; and
implementing the joint plan during the future time interval.

13. The system of claim 12, wherein classifying the historical application requests comprises classifying the historical application requests based on a ratio of computer processing unit (CPU) and memory for the historical application requests.

14. The system of claim 12, wherein the forecast comprises confidence intervals including an upper bound and a lower bound, and wherein calculating the joint plan is based on the lower bound of the forecast.

15. The system of claim 12, the processor configured to perform a method further comprising:
performing a two-sample test using the labeled historical application requests and updated labeled application requests received after the labeled historical application requests; and
in response to rejecting a null hypothesis that the labeled historical application requests and the updated labeled application requests are from the same distribution, generating a new forecast using the updated labeled application requests.

16. The system of claim 12, wherein the forecast predicts, for a first application request type, a total number of hours for serving the first application request type in the future time interval.

17. A computer program product comprising a computer readable storage medium having program instructions embodied therewith, wherein the computer readable storage medium is not a transitory signal per se, the program instructions executed executable by a processor to cause the processor to perform a method comprising:
classifying historical application requests from a past time interval for a first workload to generate labeled historical application requests;
generating a forecast based on the labeled historical application requests and for predicting future application requests for the first workload for a future time interval;
calculating a joint plan based on the forecast, wherein the joint plan comprises a set of virtual resources, a set of billing contracts, and a set of load balancer weights, wherein the set of virtual resources comprises a first quantity of a first type of virtual machine that is procured by a first billing contract of the set of billing contracts, and wherein the set of load balancer weights comprises a first fraction of a first application request type to be implemented by the first quantity of the first type of virtual machine during the future time interval; and
implementing the joint plan during the future time interval.

18. The computer program product of claim 17, wherein classifying the historical application requests comprises classifying the historical application requests based on a ratio of computer processing unit (CPU) and memory for the historical application requests.

19. The computer program product of claim 17, wherein the forecast comprises confidence intervals including an upper bound and a lower bound, and wherein calculating the joint plan is based on the lower bound of the forecast.

20. The computer program product of claim 19, the program instructions further configured to cause the processor to perform a method further comprising:
performing a two-sample test using the labeled historical application requests and updated labeled application requests received after the labeled historical application requests; and
in response to rejecting a null hypothesis that the labeled historical application requests and the updated labeled application requests are from the same distribution, generating a new forecast using the updated labeled application requests.

\* \* \* \* \*